United States Patent [19]

Farley et al.

[11] Patent Number: 5,530,065

[45] Date of Patent: Jun. 25, 1996

[54] HEAT SEALABLE FILMS AND ARTICLES MADE THEREFROM

[75] Inventors: James M. Farley, League City; Prasadarao Meka, Seabrook; Ferdinand C. Stehling, Baytown; Barry C. Trudell; Myron B. Kurtzman, both of Houston, all of Tex.

[73] Assignee: Exxon Chemical Patents Inc., Wilmington, Del.

[21] Appl. No.: 449,870

[22] Filed: May 25, 1995

Related U.S. Application Data

[63] Continuation of Ser. No. 150,937, Nov. 12, 1993, abandoned, which is a continuation-in-part of Ser. No. 46,502, Apr. 12, 1993, abandoned, which is a continuation of Ser. No. 817,701, Jan. 7, 1992, abandoned.

[51] Int. Cl.$^6$ ................................................. C08L 23/00
[52] U.S. Cl. ......................... 525/240; 525/191; 525/192; 525/195; 525/242; 428/34.1; 428/35.7; 428/349; 428/500; 428/515; 428/516; 156/308.4
[58] Field of Search .................... 525/191, 192, 525/195, 240, 242; 428/34.1, 35.7, 349, 500, 515, 516; 156/308.4

[56] References Cited

U.S. PATENT DOCUMENTS

| | | |
|---|---|---|
| 3,645,992 | 2/1972 | Elston . |
| 4,243,619 | 1/1981 | Fraser et al. . |
| 4,291,092 | 9/1981 | Weiner . |
| 4,339,496 | 7/1982 | Weiner . |
| 4,340,640 | 7/1982 | Weiner . |
| 4,374,227 | 2/1983 | Michie, Jr. . |
| 4,399,173 | 8/1983 | Anthony et al. . |
| 4,405,774 | 9/1983 | Miwa et al. . |
| 4,429,079 | 1/1984 | Shibata et al. . |
| 4,438,238 | 3/1984 | Fukushima et al. . |
| 4,600,614 | 7/1986 | Lancaster et al. . |
| 4,612,300 | 9/1986 | Coleman, III . |
| 4,643,945 | 2/1987 | Kiang . |
| 4,668,752 | 5/1987 | Tominari et al. . |
| 4,734,328 | 3/1988 | Kohyama et al. . |
| 4,766,035 | 8/1988 | Lancaster et al. . |
| 4,786,697 | 11/1988 | Cozewith et al. . |
| 4,789,714 | 12/1988 | Cozewith et al. . |
| 4,847,155 | 7/1989 | Lancaster et al. . |
| 4,935,474 | 6/1990 | Ewen et al. . |
| 4,937,299 | 6/1990 | Ewen et al. . |
| 5,032,463 | 7/1991 | Smith . |
| 5,089,321 | 2/1992 | Chum et al. . |
| 5,112,696 | 5/1992 | Roberts . |
| 5,206,075 | 4/1993 | Hodgson, Jr. ........................... 428/216 |

FOREIGN PATENT DOCUMENTS

| | | |
|---|---|---|
| 0057238 | 8/1982 | European Pat. Off. . |
| 0180478 | 5/1986 | European Pat. Off. . |
| 0186279 | 7/1986 | European Pat. Off. . |
| 0221726 | 5/1987 | European Pat. Off. . |
| 0244982 | 11/1987 | European Pat. Off. . |
| 0247897 | 12/1987 | European Pat. Off. . |

(List continued on next page.)

OTHER PUBLICATIONS

Speed et al., "Structure/Property Relationships in Exxpol™ Polymers", Feb. 24–27, 1991, Polyolefins VII.
International Conference, Houston, Texas.
Research Disclosure, Nov. 1983, abstract No. 23532, disclosed by S. J. Kurtz, G. E. Ealer, J. C. Miller and F. A. Ruiz of Union Carbide Corp., Bound Brook, NJ.

*Primary Examiner*—James J. Seidleck
*Assistant Examiner*—Duc Truong
*Attorney, Agent, or Firm*—Jaimes Sher; Darrell E. Warner

[57] ABSTRACT

Heat sealed articles and heat sealable films comprising a polymer blend of a first polymer having a narrow molecular weight and composition distribution and a second polymer having a broad molecular weight distribution and composition distribution. The articles and films have significantly improved physical characteristics and remarkably low heat seal initiation temperatures, high seal strength, high hot tack and therefore provide improved processibility and higher line speeds on commercial heat sealing equipment.

42 Claims, 5 Drawing Sheets

FOREIGN PATENT DOCUMENTS

| | | |
|---|---|---|
| 0260038 | 3/1988 | European Pat. Off. . |
| 0286177 | 10/1988 | European Pat. Off. . |
| 0341091 | 11/1989 | European Pat. Off. . |
| 0397517 | 11/1990 | European Pat. Off. . |
| 0461848 | 12/1991 | European Pat. Off. . |
| 52-94381 | 8/1977 | Japan . |
| 57-59943 | 4/1982 | Japan . |
| 60-67546 | 4/1985 | Japan . |
| 61-25538 | 2/1986 | Japan . |
| 61-243842 | 10/1986 | Japan . |
| 61-246061 | 11/1986 | Japan . |
| 61-258849 | 11/1986 | Japan . |
| 62-10150 | 1/1987 | Japan . |
| 62-064846 | 3/1987 | Japan . |
| 1-105288 | 4/1989 | Japan . |
| 2063278 | 6/1981 | United Kingdom . |
| WO90/03414 | 4/1990 | WIPO . |
| 93/03093 | 2/1993 | WIPO . |
| 94/06857 | 3/1994 | WIPO . |

HEAT SEALABLE FILMS AND ARTICLES MADE THEREFROM

CROSS REFERENCE TO RELATED PATENT APPLICATIONS

This is a continuation of application Ser. No. 08/150,937, filed Nov. 12, 1993, now abandoned which is a continuation-in-part of U.S. application Ser. No. 08/046,502, filed Apr. 12, 1993, now abandoned which is a continuation of U.S. application Ser. No. 07/817,701, filed Jan. 7, 1992, now abandoned.

FIELD OF THE INVENTION

The present invention relates to heat sealable films and articles. In particular, the invention relates to a blend of polymers one of which has a narrow molecular weight distribution and narrow composition distribution, the other has a broad molecular weight and composition distribution. The blends of the invention exhibit excellent heat sealing and other physical properties. The blends may be used to make films, bags, pouches, tubs, trays, lids, packages, containers and other articles employing a heat seal.

BACKGROUND OF THE INVENTION

Many articles of manufacture employing heat seals are currently available in the marketplace. Generally, the seals on such articles may be employed by welding two separate portions of the article together. For example, plastic parts usefully employed in machines and toys may be constructed by joining together two individual plastic pieces by heating one or both of the plastic pieces, pressing them together, and then, allowing them to cool. Specifically, heat sealing is very important in packaging applications. Packages formed by a heat seal provide for the efficient transportation of a consumer item within the package, provide a display of the consumer item that promotes sales, and, in the food industry, the packaging is employed to preserve the freshness of the consumer item. Most importantly and related to heat seal a manufacturer of packages or any other like article requiring a seal requires excellent processibility.

Various types of polymers are used to form articles, which include packages, that may be joined together or sealed by the application of heat and/or pressure. Polymers or blends of polymers used to make the articles are selected for use because they provide a strong seal, which is easily and rapidly formed by a single short application of heat and/or pressure. Occasionally, the entire heat sealed article is constructed from the same polymer or a blend of polymers or by the coextrusion of the same or different polymers.

More often, the article is constructed of various areas or layers of different materials, and polymers which provide good heat sealing properties are utilized only in areas, or layers, where heat sealing will ultimately be necessary. This type of construction is employed because the articles, for instance multilayer films, should have desirable physical and mechanical properties such as clarity, strength, resistance to puncture and tearing, in addition to heat sealing properties, and should be easily processed by high speed equipment. Many plastic materials are known to possess good physical and mechanical properties but often do not also possess good heat sealing properties. For example, polypropylene has good strength and clarity and is resistant to tearing, but does not readily form good seals at the temperatures which are preferred in commercial sealing machinery. Conversely, some polymers with good heat sealing properties do not have adequate strength or clarity.

The packaging art has therefore developed multiple layer articles such as multilayer films incorporating one or more layers of the same or different types of polymers blended or coextruded together that provide good mechanical and physical properties and providing one or more additional layers formed from polymers that provide the article of manufacture with good heat sealing properties. In this way, for example, a film may be produced having a substrate layer of polypropylene provided for strength and clarity, and a layer of polyethylene to provide good heat sealing properties. Other articles, in addition to films, may be similarly constructed with a plurality of materials, each material selected to contribute to one or more of the desired properties of the final article.

Various types of polyethylene polymers are known in the art as having acceptable heat sealing properties. Low density polyethylene ("LDPE") is generally prepared at high pressure using free radical initiators and typically has a density in the range of 0.915–0.940 g/cm$^3$. LDPE is also known as "branched" polyethylene because of the relatively large number of long chain branches extending from the main polymer backbone.

High density polyethylene ("HDPE") usually has a density in the range of greater than 0.940 to 0.960 g/cm$^3$. HDPE is prepared using a coordination catalyst, e.g., Ziegler-Natta type catalysts, at low or moderate pressures, but sometimes at high pressure. HDPE is generally linear without any substantial side chain branching. HDPE is a substantially crystalline polymer.

Linear low density polyethylene ("LLDPE") is generally prepared in the same manner as HDPE, but incorporates a relatively minor amount of an alpha-olefin comonomer such as butene, hexene or octene to introduce enough short chain branches into the otherwise linear polymer to reduce the density of the resultant polymer into the range of that of LDPE. The coordination catalysts used to interpolymerize ethylene and the alpha-olefins generally produce a LLDPE with a broad composition distribution, as hereinafter defined, and a relatively broad molecular weight distribution, i.e., Mw/Mn greater than about 3, wherein Mw is the weight average molecular weight and Mn is the number average molecular weight.

Polyethylenes such as LLDPE described above have a broad molecular weight distribution which can be undesirable in many respects. For example, LLDPE resins known previously in the art contain relatively high molecular weight molecules that are subject to an orientation, which results in anisotropic properties in the machine direction compared to the transverse direction of a fabrication process. The higher molecular weight molecules having low comonomer content also have less desirable heat sealing properties. On the other hand, resins containing relatively lower molecular weight molecules, in which the comonomer is invariably concentrated, have better heat sealing properties but tend to exhibit high block and tackiness properties. These lower molecular weight, highly branched molecules also interfere with the proper function of certain additives compounded in the resin, increase the percentage of extractable polymer, and increase fouling in the polymerization plant. The relatively high alpha-olefin comonomer content of these low molecular weight polymer molecules causes such polymer molecules to be generally amorphous and to exude to the surface of fabricated parts, thereby producing an undesirable sticky surface.

Previously known blends of or coextruded polyethylenes designed to improve one or more of the properties of a resulting film or the like relative to its components or relative to polyethylene homopolymers in the past have also suffered from the drawbacks mentioned above. For example, incorporating a blend component with a high average comonomer content to reduce crystallinity and improve heat sealability generally results in an increase of extractables and adversely affects other properties so that the full advantage of the blend is not realized.

Therefore, a need exists for a polymer blend that exhibits improved heat sealing while maintaining other desirable physical properties.

SUMMARY OF THE INVENTION

The blend of polymers of the invention generally include a first polymer, component A, which has a narrow molecular weight distribution and composition distribution and a second polymer, component B, which has a broad molecular weight distribution and composition distribution.

In one embodiment of the invention, component A can be produced by a metallocene catalyst as later defined in this patent specification and component B can be produced by a conventional Ziegler-Natta catalyst.

In another embodiment of the invention, component A comprises between about 40 to 99 weight percent of the total weight percent polymer blend and component B comprises between about 1 to about 60 weight percent of the total weight percent polymer blend of the invention.

In yet another embodiment, the polymer blend of the invention is useful in as a film layer in an article of manufacture, particularly in a heat sealable article where the film layer is a seal layer.

BRIEF DESCRIPTION OF THE DRAWINGS

The foregoing aspects, features, and advantages of the invention will become clearer and more fully understood when the following detailed description is read in conjunction with the accompanying drawings, in which.

DETAILED DESCRIPTION OF THE INVENTION

Introduction

The invention concerns a blend of a metallocene catalyzed polymer, component A and a conventional Ziegler-Natta catalyzed polymer, component B, their production and applications for their use. The polymer blend of the invention has unique properties which make them particularly well suited for use in polymeric films. These films are very useful in applications requiring heat sealability.

It has been discovered previously that polymers derived from metallocene catalyst systems surprisingly heat seal extremely well, as compared to polymer produced by conventional Ziegler-Natta catalysts, see PCT Application No. WO 93/03093, published Feb, 18, 1993. However, these polymers do not process as well as polymers produced with a conventional catalyst. Typically, to improve processability blends of polymers are formed as previously discussed. These blends generally possess some of the better properties each polymer has individually with an increase in other undesirable properties. Also, the better properties of each polymer are greatly reduced when blended.

Surprisingly and unexpectedly applicants have discovered a polymer blend that retains improved heat sealing and improved processability while maintaining other desirable physical properties.

Production of Polymer Component A of the Invention

The polymer, component A, of this invention can be produced using metallocene catalyst systems in a polymerization or copolymerization process in gas, slurry solution or high pressure phase.

The process for polymerizing or copolymerizing involves the polymerization of one more of the alpha-olefin monomers having from 2 to 20 carbon atoms, preferably 2–15 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1 and cyclic olefins such as styrene. Other monomers can include polar vinyl, dienes, norbornene, acetylene and aldehyde monomers. Preferably a copolymer of ethylene is produced such that the amount of ethylene and comonomer is adjusted to produce a desired polymer product. Preferably the comonomer is an alpha-olefin having from 3 to 15 carbon atoms, more preferably 4 to 12 carbon atoms and most preferably 4 to 10 carbon atoms. In another embodiment ethylene is polymerized with at least two comonomers to form a terpolymer and the like. If a comonomer is used then the monomer is generally polymerized in a proportion of 70.0–99.99, preferably 70–90 and more preferably 80–95 or 90–95 mole percent of monomer with 0.01–30, preferably 3–30 and most preferably 5–20, 5–10 mole percent comonomer.

For the purposes of this patent specification the term "metallocene" is defined to contain one or more cyclopentadienyl moiety in combination with a transition metal. The metallocene catalyst component is represented by the general formula $(C_p)_mMR_nR'_p$ wherein $C_p$ is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. The metallocene can be substituted with principally hydrocarbyl substituent(s) but not to exclude a germanium, a phosphorous, a silicon or a nitrogen atom containing radical or unsubstituted, bridged or unbridged or any combination.

Various forms of the catalyst system of the metallocene type may be used in the polymerization process of this invention. Exemplary of the development of these metallocene catalysts for the polymerization of ethylene is found in U.S. Pat. No. 4,871,705 to Hoel, U.S. Pat. No. 4,937,299 to Ewen, et al. and EP-A- 0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and includes alumoxane as the cocatalyst. There are a variety of methods for preparing alumoxane one of which is described in U.S. Pat. No. 4,665,208.

Other cocatalysts may be used with metallocenes, such as trialkylaluminum compounds; or ionizing ionic activators or compounds such as, tri (n-butyl) ammonium tetra (pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds are described in EP-A-0 520 732, EP-A-0 277 003 and EP-A-0 277 004 both published Aug. 3, 1988 and U.S. Pat. Nos. 5,153,151 and 5,198,401 and are all herein fully incorporated by reference.

Further, the metallocene catalyst component can be a monocyclopentadienyl heteroatom containing compound. This heteroatom is activated by either an alumoxane or an ionic activator to form an active polymerization catalyst system to produce polymers useful in this present invention. These types of catalyst systems are described in, for example, PCT International Publications WO 92/00333 published Jan. 9, 1992, U.S. Pat. Nos. 5,096,867 and 5,055,438, EP-A-0 420 436 and WO 91/04257 all of which are fully incorporated herein by reference.

In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr. 29, 1993 all of which are herein incorporated by reference. All the catalyst systems described above may be, optionally, prepolymerized or used in conjunction with an additive or scavenging component to enhance catalytic productivity.

The catalyst particles in a gas phase process may be supported on a suitable particulate material such as polymeric supports or inorganic oxide such as silica, alumina or both. Methods of supporting the catalyst of this invention are described in U.S. Pat. Nos. 4,808,561, 4,897,455, 4,937,301, 4,937,217, 4,912,075, 5,008,228, 5,086,025, 5,147,949, 5,238,892 and 5,240,894, all of which are herein incorporated by reference.

Characteristics of Polymer Component A of the Invention

A key characteristic of polymer Component A of the present invention is its composition distribution (CD). As is well known to those skilled in the art, the composition distribution of a copolymer relates to the uniformity of distribution of comonomer among the molecules of the copolymer. Metallocene catalysts are known to incorporate comonomer very evenly among the polymer molecules they produce. Thus, copolymers produced from a catalyst system having a single metallocene component have a very narrow composition distribution—most of the polymer molecules will have roughly the same comonomer content, and within each molecule the comonomer will be randomly distributed. Ziegler-Natta catalysts, on the other hand generally yield copolymers having a considerably broader composition distribution. Comonomer inclusion will vary widely among the polymer molecules.

A measure of composition distribution is the "Composition Distribution Breadth Index" ("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions less than 15,000 are ignored. These low weight fractions generally represent a trivial portion of the resin of the present invention. The remainder of this description and the appended claims maintain this convention of ignoring weight fractions below 15,000 in the CDBI measurement.

From the weight fraction versus composition distribution curve the CDBI is determined by establishing what weight percent of the sample has a comonomer content within 25% each side of the median comonomer content. Further details of determining the CDBI of a copolymer are known to those skilled in the art. See, for example, PCT Patent Application WO 93/03093, published Feb. 18, 1993.

The polymers of the present invention have CDBI's generally in the range of 50–98%, usually in the range of 60–98% and most typically in the range of 65–95%. Obviously, higher or lower CDBI's may be obtained using other catalyst systems with changes in the operating conditions of the process employed.

MWD, or polydispersity, is a well known characteristic of polymers. MWD is generally described as the ratio of the weight average molecular weight (Mw) to the number average molecular weight (Mn). The ratio Mw/Mn can be measured directly by gel permeation chromatography techniques.

Those skilled in the art will appreciate that there are several methods for determining MWD of a polymer sample. For the purposes of this patent specification the molecular weight distribution of a polymer can be determined with a Waters Gel Permeation Chromatograph equipped with Ultrastyrogel columns and a refractive index detector. In this development, the operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

The MWD of the polymer component A of this invention are termed "narrow". For the purposes of this patent specification "narrow" MWD means a Mw/Mn less than about 3, preferably less than or equal to 2.5.

The MI of the polymers of the invention are generally in the range of about 0.1 dg/min to about 1000 dg/min, preferably about 0.2 dg/min to about 300 dg/min, more preferably about 0.3 to about 200 dg/min and most preferably about 0.5 dg/min to about 100 dg/min.

Contemplated densities of component A of the invention are in the range of 0.85 to 0.96 g/cm$^3$, preferably 0.87 to 0.940 g/cm$^3$, more preferably 0.88 to about 0.935 g/cm$^3$. In another embodiment the density of component A is in the range of 0.900 to 0.915 g/cm$^3$, 0.915 to 0.940 g/cm$^3$, 0.88 to 0.9 g/cm$^3$ and greater than 0.940 g/cm$^3$ to 0.96 g/cm$^3$.

In another embodiment, component A can comprise a blend of component A polymers, which can be prepared by blending the desired components in the desired proportion using conventional blending techniques and apparatus, such as, for example, screw-type extruders, Banbury mixers, and the like. Alternatively, the blends may be made by direct polymerization, without isolation of the blend components, using, for example, two or more catalysts in one reactor, or by using a single catalyst and two or more reactors in series or parallel.

Characteristics of Polymer Component B of the Invention

Polymer, component B, of the invention is very well known in the art and may be prepared by a traditional Ziegler-Natta catalysis. For example, U.S. Pat. No. 4,719,193, incorporated herein by reference, discloses a method of preparing traditional polyethylene copolymers. Other references include U.S. Pat. No. 4,438,238, V. B. F. Mathot and M. F. J. Pijpers, J. Appl. Polym. Sci., 39, 979 (1990), and S. Hosoda, Polymer Journal, 20, 383 (1988).

Generally, the molecular weight of the B component copolymer is in the range of 40,000 to 300,000, the melt index (MI) should be 0.05 to 20 and the density ranges from 0.9 to 0.95 g/cm$^3$. The amount of comonomer polymerized with ethylene ranges from 0.5 to 5 mole percent and the density ranges from 0.91 to 0.93 g/cm$^3$. Comohomers listed above for preparing A component polymers are useful as well in forming B component polymers. Hydrogen may be utilized, as is well-known, to adjust the molecular weight of the resulting polymers. Typically polymer component B have a molecular weight distribution greater than 3.5 more desirably greater than 4.0.

The B component of the polymer blend of the invention may consist of a blend of different prior art polymers, each differing in one or more of: molecular weight, MWD, comonomer type and content, density, MI and CD.

Blends, Films And Articles Of The Invention

The polymer blend of the invention, herein referred to as, the "A–B blend", may be used to form articles with particularly desirable heat sealing properties. In particular, the A-B blend may be processed into films which possess particularly desirable heat sealing characteristics.

For example, the A-B blend may be used to form films which are in turn formed into bags or pouches by heat sealing techniques known in the art. The heat sealable film may also be used as package sealing material, for example, the film may be placed over the opening of a container, and then secured to the container by the application of heat. This technique may be used to seal perishable items, such as food, into paper, plastic, glass, ceramic or metallic containers. The technique may also be used to package consumer items in attractive sales displays and to secure items for transportation.

The articles described herein are formed from the A–B blend of the invention. The articles may comprise other materials, especially in portions of the article not be utilized for heat sealing. In the portions of the article that are used for heat sealing, the language "formed from" is intended to mean "comprising." In one embodiment, all articles or portions of articles described herein may also be constructed to consist essentially of the inventive A–B blends. In other words, the heat sealing portion of any article described herein may consist essentially of the inventive A–B blend or of the polymer.

The A–B blend of polymers may be formed into films by methods well known in the art. For example, the polymers may be extruded in a molten state through a flat die and then cooled. Alternatively, the polymers may be extruded in a molten state through an annular die and then blown and cooled to form a tubular film. The tubular film may be axially slit and unfolded to form a flat film. The films of the invention may be unoriented, uniaxially oriented or biaxially oriented.

The films of the invention may be single layer or multiple layer films. The multiple layer films may comprise of one or more layers formed from the A–B polymer blend. The films may also have one or more additional layers formed from other materials such as other polymers, polypropylene, polyester, LDPE, HDPE, PP, EVA and EVOH for instance, metal foils, paper and the like.

Multiple layer films may be formed by methods well known in the art. If all layers are polymers, the polymers may be coextruded through a coextrusion feedblock and die assembly to yield a film with two or more layers adhered together but differing in composition. Multiple layer films may also be formed by extrusion coating whereby a substrate material is contacted with the hot molten polymer as the polymer exits then die. For instance, an already formed polypropylene film may be extrusion coated with an A–B blend film as the latter is extruded through the die. Extrusion coating is particularly useful when the A–B blend heat seal layer is to be applied to substrates that are woven or knitted from natural or synthetic fibers or yarns, e.g., textiles, or substrates made from non-polymer materials such as glass, ceramic, paper or metal.

Multiple layer films may also be formed by combining two or more single layer films prepared as described above. For instance, a polypropylene substrate film may be combined with an A-B blend heat seal film thus yielding a two layer film that would have the strength properties of polypropylene and the heat sealing characteristics of the A–B blend film. The two layers of a film so formed may be adhered together with an adhesive or by the application of heat and pressure.

The heat sealed article may be formed by pressing at least two portions of the article together at a temperature sufficient to soften at least one of the article portions. The article portion which has been softened by heat is formed from the A–B blend of polymers. Although it is sufficient if only one of the article portions being heated and pressed to form a heat seal is formed from the A-B, it is preferable for all article portions directly involved in the heat seal to be formed from the A–B blend. Other portions of the article may be constructed of other materials.

The heat sealing temperatures must be high enough to soften the A–B blend polymers so that they will stick to the material to which they are being sealed. The heat sealing temperature may range as high as the melting temperature of component A or even higher, but at temperatures this high the sealing contact time must be shortened.

The seals are formed by heating one or both of the article portions to the necessary temperature, pressing the article portions together for a time sufficient to cause them to meld together, at least partially, and then cooling the seal. The pressure needed to join the portions will depend on the article shape, the thickness of the sealing layer, the composition of the sealing layer and the temperature at which the seal is made.

The heat sealed article so formed may be a sealed container comprising a body and a sealing member secured thereto, wherein the sealing member comprises a seal layer comprising the A–B blend polymers.

The body, as described previously, may be constructed of any of a number of different materials such as paper, plastic, glass, ceramics, metals and textiles. The body can be constructed with walls that are impervious to liquids and/or gasses or the body may be constructed to allow the passage of liquids and/or gasses. the body may also be constructed with one or more portals to allow passage of small items through the body wall or to allow the consumer to inspect the item stored in the container without removing the item from the container.

Figure 9:
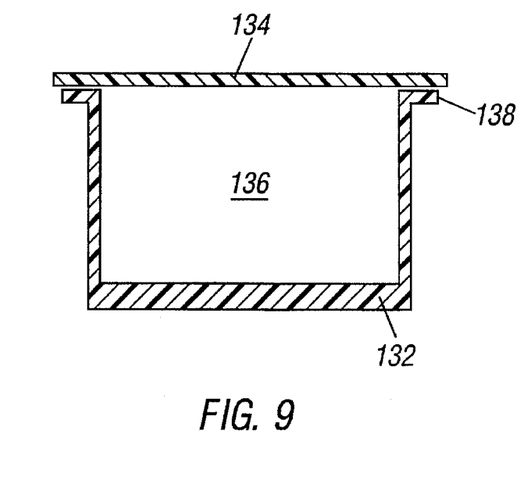
FIG. 9 is a cross-sectional view of a sealed container according to the invention.

In commercial applications, the open chamber 136 is filled with the item to be packaged and the sealing member 134 is then pressed against the flange 138. The sealing member 134, the flange 138 or both may be preheated prior to contact or one or both may be heated after contact. In any event, the sealing member 134 is pressed against flange 138 at a temperature sufficient to soften the sealing member 134. After sealing member 134 has been pressed against flange 138 under heat and pressure sufficient to form a heat seal, the heat and pressure are removed and the sealed are is cooled. The resulting article is a sealed container with the consumer item sealed in chamber 136.

Figure 10:
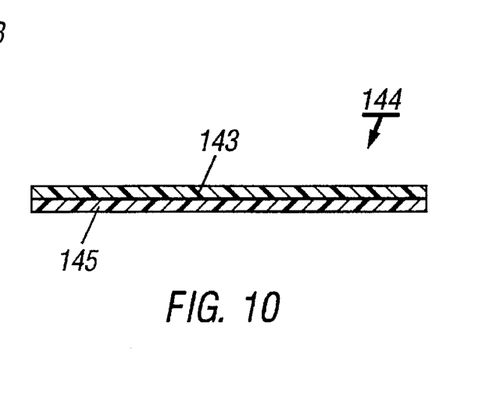
FIG. 10 is a cross-sectional view of a film, or lid or sealing member to the invention.

As discussed above, the sealing member may be constructed solely from the inventive A–B polymer blends, or the sealing member may be a multi-layer film. If the sealing member is constructed from more than one material, the A–B blend, or blends thereof, need to be utilized only in the areas where the heat seal will be formed. For example, the sealing member may be constructed as shown in FIG. 10 which is a cross-section of a 2-layer film. The sealing member 144 may be constructed of a substrate layer 143 and a heat sealing layer 145.

In one embodiment, the polymer blend of the invention contains about 40 to 99 weight percent of polymer component A, preferably 50 to 99 percent, more preferably 60 to 99 weight percent, even more preferably 65 to 98 weight percent and most preferably 70 to 95 weight percent.

In one embodiment of the invention the polymer blend contains about 1 to 60 weight percent of polymer component B, preferably 1 to 50 weight percent, more preferably 1 to 40 weight percent, even more preferably 2 to 35 weight percent and most preferably 5 to 30 weight percent.

The blend may also be compounded with various conventional additives known in the art such as, for example, antioxidants, UV stabilizers, pigments, fillers, slip additives, block additives, and the like.

There are several important characteristics of a good heat sealing polymer. One important characteristic is the heat seal initiation temperature. This is the temperature to which the polymer must be heated before it will undergo useful bonding to itself under pressure. Therefore, heat sealing temperatures above the seal initiation temperature result in heat seals with considerable and measurable seal strength. Relatively lower heat seal initiation temperatures are desirable in commercial heat sealing equipment. The lower temperatures provide for higher production rates of the packages on the equipment because the polymer need not be heated to as great a temperature to make the seal. The critical factor controlling the production rates in heat sealing is the time required to transfer the heat to the interface and melt the polymer film. Lower seal initiation temperature provides shorter times to transfer the heat and therefore melt the polymer. Also, cooling of the seal to attain adequate strength will be faster.

Seal initiation temperature (SIT) is defined as the minimum temperature required to develop measurable strength (0.5N/cm or higher) of the heat seals. Plateau strength on-set temperature (POST) is the temperature is defined as the temperature at which the seal strength reaches to the maximum level and more importantly the failure mode is tearing or inseparable bond formation.

In one embodiment the polymer blend of the invention generally has a seal initiation temperature less than about 110° C., preferably less than about 105° C., more preferably less than about 100° C., even more preferably less than about 95° C. and most preferably less than 93° C.

The limiting factor controlling the productivity (# packages/Unit Time) in commercial heat sealing operations is the time required to transfer the heat to the interface and achieve the desirable temperature for sealing. The lower the SIT and POST, the shorter is the time required to transfer the heat to the interface for sealing the surfaces. Qualitatively, every 10° C. decrease in the SIT and/or POST will result in 30% improvement in the productivity. Applications requiring inseparable bond formation or tearing failure mode, the sealing is usually conducted at POST. However, there may be applications where lower seal strength is desirable and peeling or peeling and tearing is required, the sealing could be conducted between SIT and POST, and the productivity could be significantly increased if the temperature is closer to SIT.

In one embodiment the polymer blend of the invention has a seal strength greater than about 3N/cm at a sealing temperature of about 95° C.

In another embodiment, the polymer blend has a seal strength greater than about 5N/cm at a sealing temperature of about 100° C.

A third important characteristic is the sealing window which is the range of temperatures acceptable for forming a seal. The sealing window determines the acceptable range of operating temperatures where seal strength remains essentially constant. The low temperature in the range is the plateau on-set temperature and the upper temperature in the range is the temperature where the seal strength begins to decrease or the polymer begins to degrade. Since it is often difficult or impossible to maintain commercial sealing equipment at exactly the same temperature throughout a commercial sealing run, a broader range of acceptable sealing temperatures makes it easier to assure that all heat seals made will have acceptable strength.

A fourth important sealing characteristic is a measure of the cohesive strength during the cooling stage before solidification of a heat seal. Immediately after each seal is formed and before it cools down the sample is torn apart, and the seal strength is measured. This strength is known in the art as hot tack and is measured in N/15 mm. The higher the hot tack the better.

The interplay between these four important sealing characteristics, seal initiation temperature (SIT), seal strength (SS), seal strength plateau on-set temperature (POST) and hot tack (HT) are extremely important to a manufacture of film or the like. Particularly in the packaging area, where bags or the like are being processed and made very rapidly, these characteristics become very important. A low SIT allows a manufacturer to use less heat and/or pressure to form a seal; a high seal strength provides for a stronger and quicker forming seal; a higher POST provides for a stronger seal; high hot tack prevents the failure, opening, of a seal at the high processing speeds. All of these in combination provide a manufacturer with the ability to increase line speed of a given process. Not only will a manufacturer benefit by an increased production rate but also the cost savings associated with operating a process with significantly lower temperatures.

EXAMPLES

In order to provide a better understanding of the present invention the following examples are offered as related to actual tests performed in the practice of this invention, and illustrate the surprising and unexpected properties of the A–B blends of the invention and are not intended as a limitation on the scope of the invention.

Example I

An ethylene copolymer resin was prepared according to the prior art and is identified as Sample No. U3. Sample U3 was prepared in a fluidized bed gas phase reactor employing a titanium metal catalyst as described below. The prior art transition metal catalyst was prepared in accordance with procedures outlined in U. S. Pat. No. 4,719,193 which is incorporated herein by reference. Silica was calcined at 600° C. and then treated with triethylaluminum in a mixture of isopentane at 25° C. Magnesium dichloride was then reacted with titanium trichloride in the presence of aluminum trichloride and tetrahydrofuran (THF) solvent at 60° C. The resulting reaction product was contacted in THF solvent at 50° C. with the treated silica prepared as noted above. The resulting product was treated with a mixture of diethylaluminum chloride and tri-n-Hexyl aluminum in isopentane at 50° C. to yield the catalyst used to prepare Sample U3. The gas phase reaction was carried out at 83° C. reaction temperature, an ethylene pressure of 130 psia, hydrogen/ethylene mole ratio of 0.0556, a butene/ethylene ratio of 0.0263 and a residence time of 2.4 hours. The melt index of the copolymer as determined by ASTM-1238 was approximately 1.0 g/10 min, and a density of 0.918 g/cc. Example U5, was done similar to example U3. Examples U1, U2, U4, U6, and U8 were also carried out similar to example U3, except the comonomer was changed from butene to hexene.

Example II

Sample No. U2 is prepared using traditional Ziegler Natta catalyst systems and in isopar solvent, reaction temperature of 150–220° C., pressure of 400–600 psig, and octene/ethylene mole ratio of approximately 2.3.

Example III

Sample No. U7 is prepared using a catalyst system of titanium tetrachloride and diethyl aluminum chloride, in a series slurry reactors. In the first reactor the ethylene is polymerized to give relatively low molecular weight polymer, and in the second reactor butene comonomer is used and molecular weight is increased.

Example IV

Sample No. U9, is prepared using free radical initiation of ethylene under high pressure conditions in a tubular reactor. The reactor temperature range is 149–260° C., and pressure range of 36,000 to 45,000 psig and a residence time of 2 sec to 30 sec.

Example V

A silica supported transition metal catalyst was used for preparation of Sample X1. The supported catalyst preparation is described below. About 100 grams of high surface area (Davison 952) silica, was dehydrated by heating the silica to 800° C. for about 5 hours and maintaining flow of dry nitrogen over the silica. The dry silica was then slurried with 500 ml of dry toluene at 25° C. under a nitrogen atmosphere in a 2500 ml round-bottom flask equipped with a magnetic stirrer. Thereafter, 250 ml of methyl alumoxane in toluene (1.03 moles/liter in aluminum) was added dropwise over about 15 minutes with constant stirring of the silica slurry. Stirring was subsequently continued for 30 minutes while maintaining the temperature of the flask at 25° C. A toluene solution containing 2.00 grams of bis(n-butylcyclopentadienyl)zirconium dichloride was added to the alumoxane treated silica slurry dropwise over 15 minutes. Stirring was maintained constantly during the addition and for one additional half hour while maintaining the temperature of the slurry at 65° C. Thereafter, toluene was decanted and the solids were recovered and dried under a vacuum for four hours. Analysis of the catalyst indicated that it contained 4.5 wt% aluminum and 0.63 wt% zirconium.

Sample No. X1 was prepared using the catalyst mentioned above, under gas phase conditions, reaction temperature of 63° C., hydrogen concentration of 475 ppm, ethylene/butene mole ratio of 41.5/5.17.

Example VI

Sample No. X3, is prepared using silicon bridged transition metal catalyst. The catalyst preparation is outlined in U.S. Pat. No. 5,017,714 and 5,120,867, incorporated herein by reference. Sample No. X3 is prepared using the catalyst mentioned above, and reaction conditions of pressure 19000 psig, temperature 131 ° C., butene 66 mole%, and butene/ethylene mole ratio of 1.9. Samples, X2, X4, and X5 are also prepared using similar conditions used for Sample No. X3.

The polymer properties and the catalyst and process details on the polymers described in Examples 1–6 are shown in Table I.

Example VII

The films numbered EX. 1, 8–10, 13,14,17,20,23,28, and 35 were made on a 1 inch Killion Mini Cast Line, Model KLB 100, having thickness of 1.5 to 2.0 mils (37.5 to 50 microns).

The blends of samples numbered EX. 2–7, CEX. 1–2, EX. 11,12,15,16,18,19,21,22,24–27, and 29–37 (except EX. 35) were melt homogenized on a Werner Pfleiderer Model ZSK-57 twin screw extruder and pelletized. The blends were converted into films having a thickness of 1.5 to 2.0 mils (37.5 to 50 microns) using a 1 inch Killion Mini Cast Line, Model KLB 100.

The blend samples numbered EX. 39–44 were dry blended, followed by blown film extrusion on a 1½ inch Egan Line (Tower Flight Model) using 4/1 blowup ratio. The film thickness was approximately 2.0–2.3 mils (50–58 microns).

Heat seals were made from the films on a laboratory scale Theller Model EB heat sealer. A dwell time of about one second and a sealing pressure of 50N/cm$^2$ was used for making the seals. The seals on the films were made in the transverse direction for both blown and cast films and the heat sealing anvils were insulated from the heat sealing film by a Mylar® film. The Mylar® film is very stable at normal heat sealing temperatures and is easily removed from the heat sealing polymer after the seal has been made. The seals were aged for 24 hours before testing them for strength.

For the strength test, the sealed samples were cut into 0.5 inch (1.27 cm) wide pieces and then strength tested using an Instron instrument at a crosshead speed of 20 inches/min (508 mm/min) and a 2 inch (5.08 cm) jaw separation. The free ends of the samples are fixed in the jaws, and then the jaws are separated at the strain rate until the seal fails. The peak load at the seal break is measured and the seal strength is calculated by diving the peak load by the sample width. The seal strength values for all the films were normalized for a film thickness of 2.0 mils.

The heat seal initiation temperature was determined by measuring the seal strengths of each sample sealed at various temperatures and then extrapolating from a plot of seal strength versus temperature to find the lowest temperature at which some seal strength is present. This same plot can be used to determine the temperature at which a seal strength of 2N/cm occurs. The plot can also be used to determine the plateau on-set temperature which is defined as the temperature at which the seal strength remains relatively constant. In addition, the plateau on-set temperature represents the temperature at which tearing failure mode occurs.

The seal strength values determined on film samples numbered EX. 1–9, CEX. 1,2 and heat sealed at different temperatures are shown in Table II. The seal initiation temperatures, and plateau on-set temperatures for the film samples numbered EX. 1–9, and CEX. 1,2 are also shown in Table II.

The seal strength values determined on film samples numbered EX. 10–27 and heat sealed at different temperatures are shown in Table III. The seal initiation temperatures, and plateau on-set temperatures for the film samples numbered EX. 10–27 are also shown in Table III.

The seal strength values determined on film samples numbered EX. 10, 14, and 28–38, and heat sealed at different temperatures are shown in Table IV. The seal initiation temperatures, and plateau on-set temperatures for the film samples numbered EX. 10, 14, and 28–38, are also shown in Table IV.

The seal strength values determined on film samples numbered EX. 14, and 39–44, and heat sealed at different temperatures are shown in Table V. The seal initiation temperatures, and plateau on-set temperatures for the film samples numbered EX. 14, and 39–44, are also shown in Table V.

Figure 1:
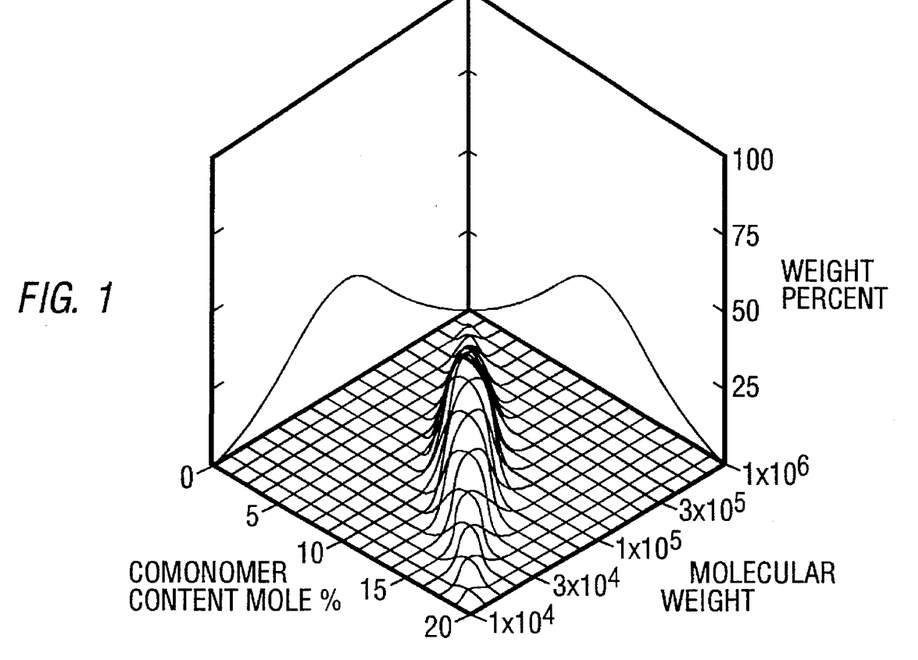
FIG. 1 illustrates the broad molecular weight distribution and broad composition distribution of a typical prior art LLDPE.
Figure 2:
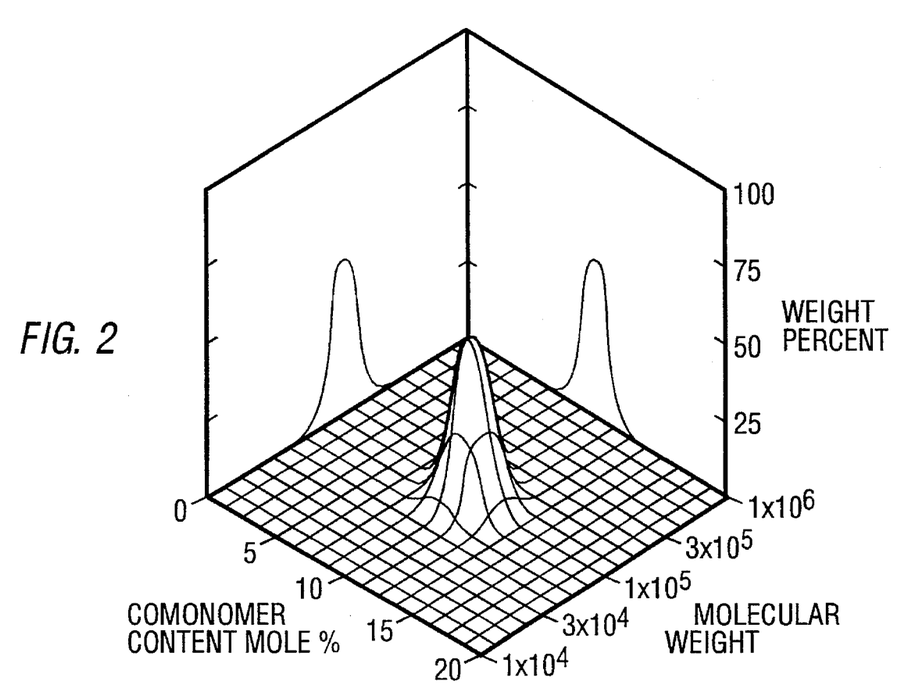
FIG. 2 illustrates the narrow molecular weight distribution and narrow composition distribution of an exemplary blend component used in the present invention.
Figure 3:
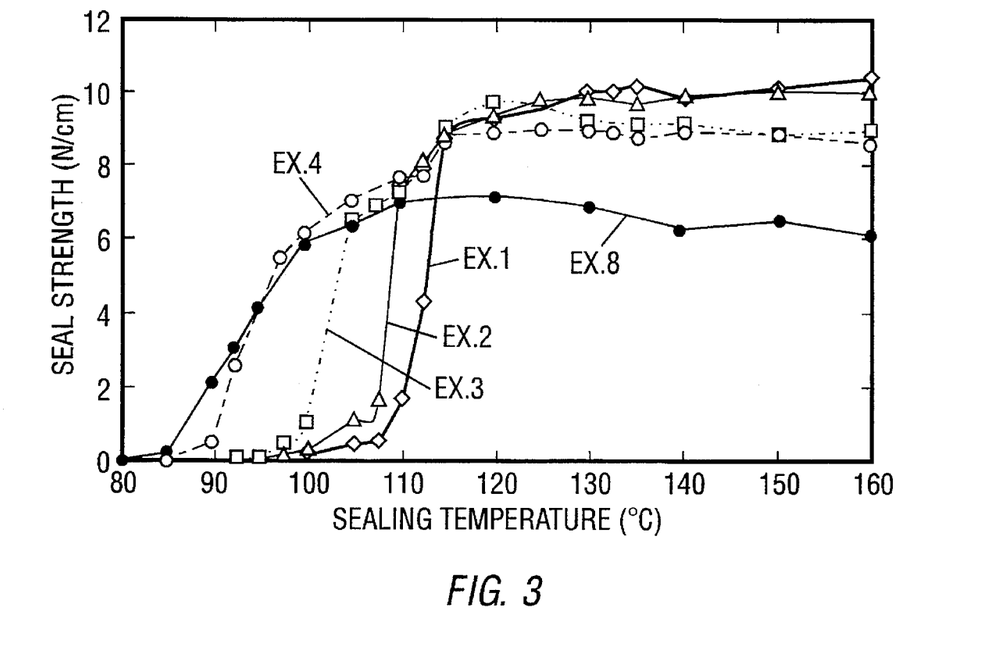
FIG. 3 is a graph of the relationship between seal strength and sealing temperature for films made from prior art polyethylene and for films made according to the invention.

FIG. 3 represents the seal strength versus temperature curves for samples numbered EX. 1–4 and 8 (Table II). The curve for the inventive sample EX. 4 shows seal initiation temperature approaching that of the film made from the narrow CD and MWD polymer sample EX. 8. In comparison to the prior art sample EX. 1, the seal initiation and plateau on-set temperatures for EX. 4 are unexpectedly lower and this improves the productivity during the sealing. A seal strength of 4N/cm for the inventive blend samples numbered EX. 2, EX.3, and EX.4 are approximately 108°, 103°, and 95° C. respectively, in comparison to 113° C. for the prior art sample numbered EX. 1. Importantly, the plateau on-set temperature EX.4 and EX. 5 is lowered by 10° and 20° C. respectively (Table II) in comparison to the prior art sample EX. 1.

Figure 4:
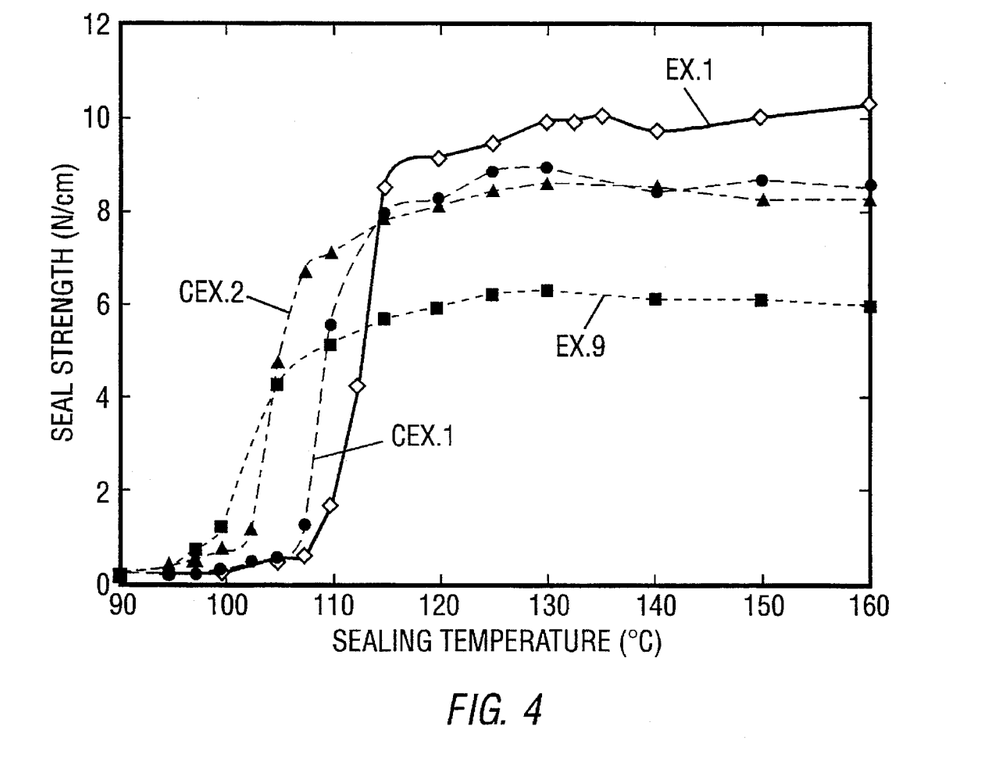
FIG. 4 is a graph of the relationship between seal strength and sealing temperature for films made from prior polyethylenes.

FIG. 4 represents the seal strength versus temperature curves for samples numbered EX. 1 and 9, and for comparative blend samples CEX. 1, and 2 (Table II). The comparative blends CEX. 1 and 2 are made from two resins which are broad in CD and MWD and having the same density difference between EX. 1 and EX. 8. Even though there is some improvement in the seal initiation temperature for the samples CEX. 1 and 2, the plateau on-set temperature remains unaffected in comparison to EX. 1.

Figure 5:
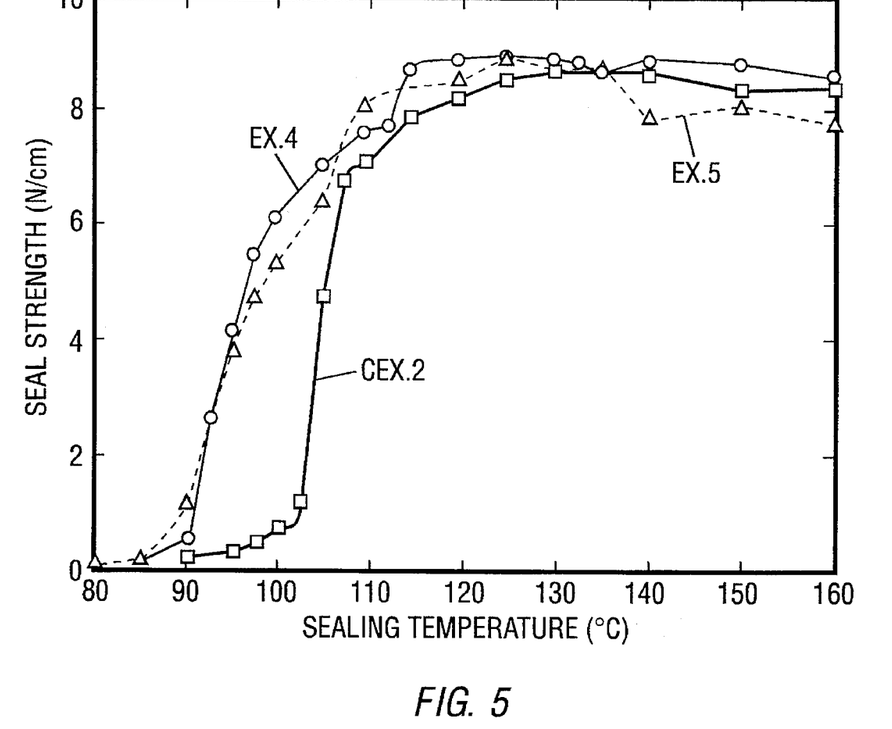
FIG. 5 is a graph of the relationship between seal strength and sealing temperature for films made according to the invention compared to films made from prior art polyethylenes.

FIG. 5 represents the seal strength versus temperature curves for the inventive samples numbered EX. 4 and 5 versus CEX. 2. The seal initiation temperature for the inventive blends is considerably lower and also the plateau on-set temperature is lowered by 10–20° C. in comparison to CEX. 2, while the plateau seal strength for all the samples remains almost constant.

Figure 6:
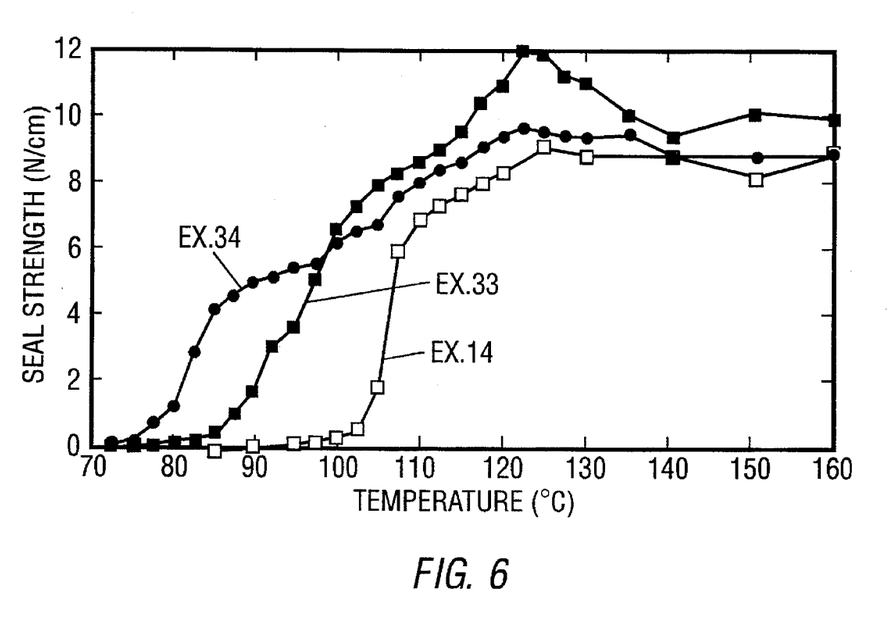
FIG. 6 is a graph of the relationship between seal strength and sealing temperature for films made according to the invention in comparison to the prior art polyethylene.

FIG. 6 represents the seal strength versus temperature curves for the inventive samples numbered EX.33 and 34 in comparison to the prior art sample EX. 14 (data shown in Table IV). As is evident the seal initiation temperature is lowered significantly in comparison to the prior art sample EX. 14, in addition to the lowering of plateau on-set temperature (Table IV). Another unexpected observation with the inventive blend samples EX. 33 and 34 is the higher plateau seal strength versus the prior art sample EX. 14.

Figure 7:
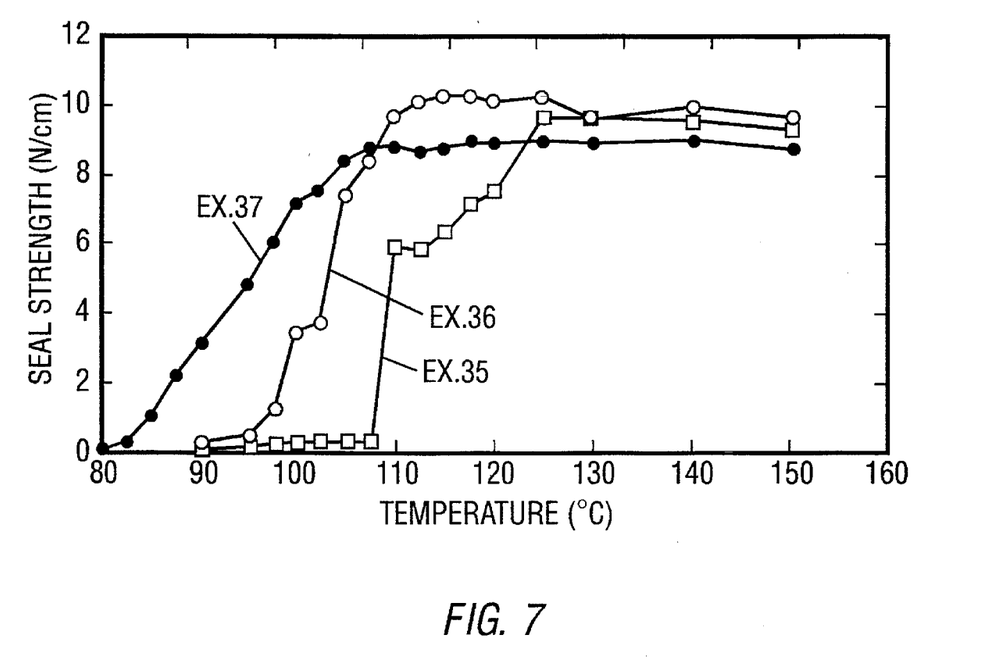
FIG. 7 is a graph of the relationship between seal strength and sealing temperature for films made according to the invention in comparison to the prior art polyethylene.

FIG. 7 represents the seal strength versus temperature curves for the inventive blend samples numbered EX. 36 and 37 in comparison to the prior art sample numbered EX.35 (data shown in Table IV). As is demonstrated earlier the seal initiation temperature for the inventive samples are significantly lower and the plateau seal strength remains fairly high and almost equivalent to the prior art sample EX.35.

Figure 8:
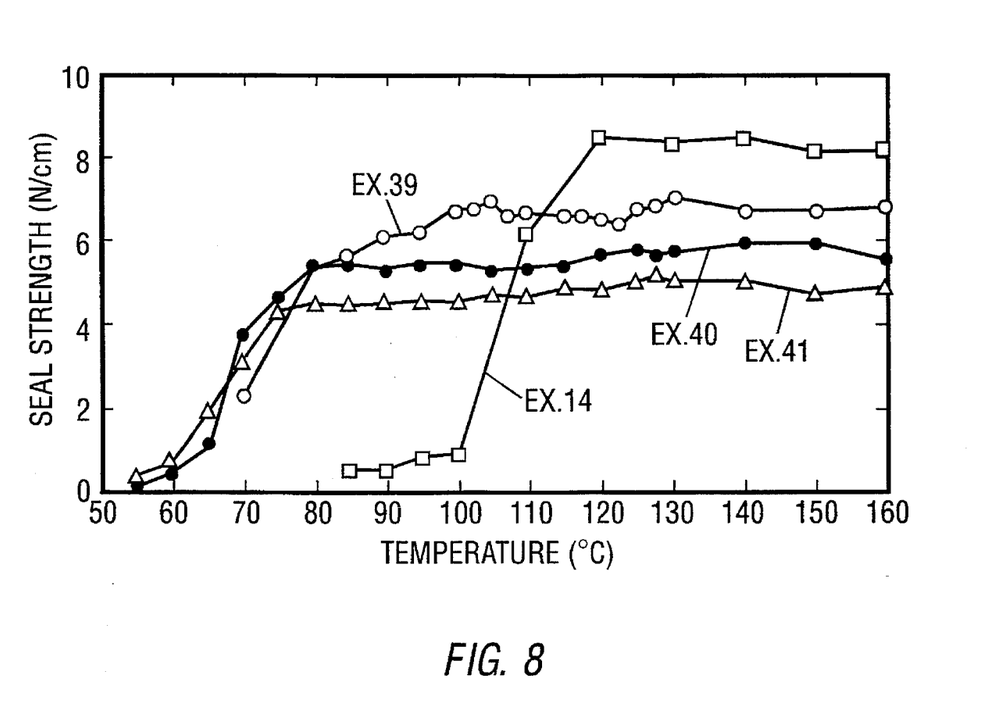
FIG. 8 is a graph of the relationship between seal strength and sealing temperature for films according to the invention compared to a prior art polyethylene.

FIG. 8 represents the seal strength versus temperature curves for the inventive blend samples numbered EX. 39–41 in comparison to the prior art sample EX. 14 (data shown in Table V). These inventive blend samples EX. 39–41 which were made by dry blending the two individual resins and made into films show the unexpected and significantly lower seal initiation temperature in comparison to the prior art sample EX. 14. Another unexpected observation with the inventive blend samples EX. 39–41 is the peeling failure mode of the seals during testing, where the two sealed surfaces are cleanly separated even for samples sealed at high temperature. More importantly, the sealing window, which is defined as the temperature range in which the seal strength remains high and constant is very broad for the inventive blends EX. 39–41. The sealing window for the inventive blend samples EX. 39–41 extends over a broad temperature range of 65°–160° C., while the sealing window for the prior an sample EX. 14 was only from 120°–160° C. The same peelable failure mode behavior was also observed for inventive blend samples numbered EX. 42–44 (data shown in Table V).

Figure 8A:
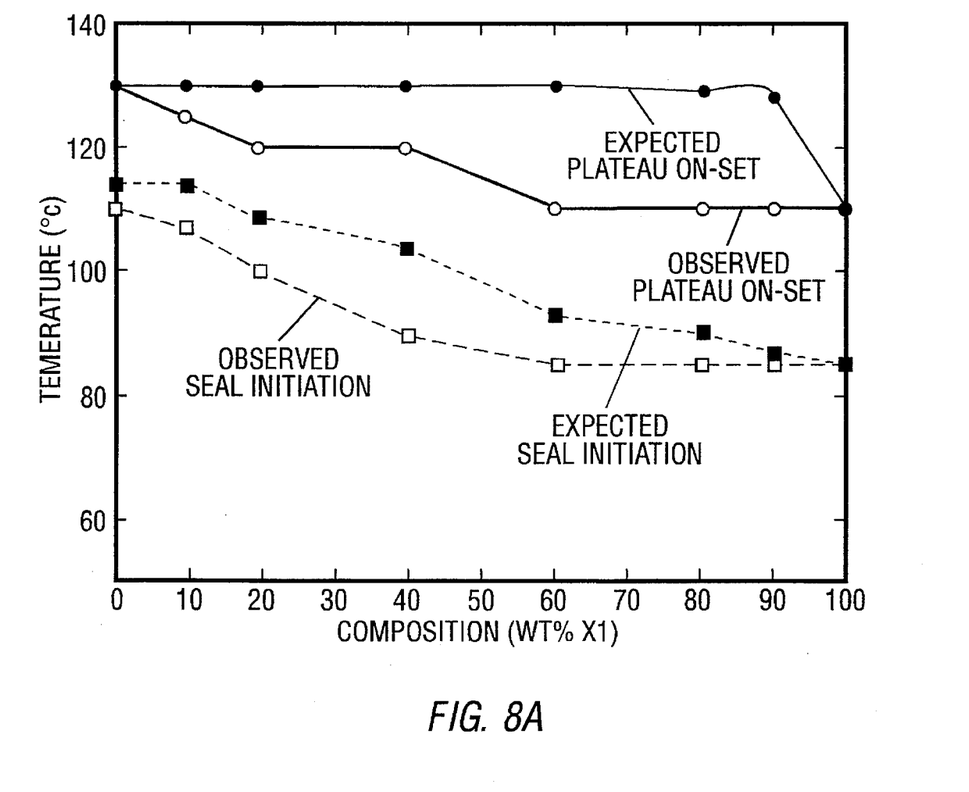
FIG. 8A is a graph illustrating the seal initiation temperature and plateau on-set temperatures for the inventive blends in comparison to prior art polyethylene.

FIG. 8A represents the relationship between observed seal initiation temperature and observed plateau on-set temperature versus composition for the inventive blends (EX. 2–7) in comparison to the prior art polyethylene (EX. 1) and the polyethylene having narrow CD and MWD (EX.8) (data is shown in Table 2). Also in FIG. 8A, the expected seal initiation temperature and the expected plateau on-set temperatures for the inventive blends over the entire composition is presented. The inventive blends clearly show the unexpected improvement in the seal initiation temperature and plateau on-set temperature.

All the inventive blend samples shown in Table II, III, IV, and V, except samples numbered EX. 24–27 (except EX. 19, Table III), having compositions of 60/40 and 40/60 (broad CD resins/narrow CD resins) give a seal strength level >3N/cm for seals made at 95° C., and higher than 5N/cm seal strength for seals made at 100° C. In comparison, seal strength levels of 3 and 5N/cm for the prior art samples numbered EX. 1, 9, 10, 14, 17, 20, 23, 28, 35, and CEX. 2 are not obtained unless the seal temperatures are 110° C. and above.

The commercial advantages to be obtained through the use of the inventive type of heat sealing articles is apparent from the figures. The inventive articles may be adequately sealed at temperatures of less than 120° C., 110° C., or 100° C., and yet retain adequate strength in the seal thus formed. In comparison prior art polymers sealed at 100° C., 110° C., or even at 120° C. and higher may not yield seals of substantial strength. It is therefore possible to use the inventive materials in commercial lines operating at a sealing temperature as low as 100° C. or less. An operating temperature of 100° C. is substantially lower than normal commercial sealing operating temperatures. With sealing temperatures as low as 100° C., substantial increases in heat sealing speed may be achieved and therefore the output of a heat sealing unit may be remarkably increased by the use of the inventive heat sealing materials.

While the present invention has been described and illustrated by reference to particular embodiments thereof, it will be appreciated by those of ordinary skill in the art that the invention lends itself to variations not necessarily illustrated herein. For instance, the catalyst system may comprise various other transition metal metallocenes that are activated by alumoxane and/or ionic activators as the cocatalyst to produce polymers having a narrow molecular weight distribution and narrow composition distribution. For this reason, then, reference should be made solely to the appended claims for purposes of determining the true scope of the present invention.

TABLE I

| SAMPLE ID | DENSITY (g/cc)/ MI (g/10 min) | CDBI % | PROCESS/CATALYST |
| --- | --- | --- | --- |
| EH. Copolymer (U1) | 0.925/1.0 | — | Gas Phase |
| EO Copolymer (U2) | 0.905/1.0 | 46 | Solution |
| EB Copolymer (U3) | 0.918/1.0 | 38 | Gas Phase |
| EH Copolymer (U4) | 0.917/1.0 | 34.3 | Gas Phase |
| EB Copolymer (U5) | 0.925/1.5 | — | Gas Phase |
| EH Copolymer (U6) | 0.935/1.0 | — | Gas Phase |
| E Homopolymer (U7) | 0.952/0.05 | — | Series Slurry/TiCl$_4$ & DEAC |
| EH Copolymer (U8) | 0.925/0.8 | — | Gas Phase |
| HP-LDPE (U9) | 0.925/2.0 | — | Tubular/Free Radical/High Pressure |
| EB Copolymer (X1) | 0.905/5.0 | 66 | Gas Phase |
| EB Copolymer (X2) | 0.905/4.5 | 91.6 | High Pressure |
| EB Copolymer (X3) | 0.887/4.5 | 93 | High Pressure |
| EH Copolymer (X4) | 0.885/4.0 | 91.9 | High Pressure |
| EB Copolymer (X5) | 0.878/3.0 | — | High Pressure |

TABLE II

Example (EX) or Comparative Examples (CEX)

| | U1 0.925 (g/cc) | X1 0.905 (g/cc) | SIT (°C.) | POT (°C.) | Strength of Seal Part (N/cm) | | | | | | |
| --- | --- | --- | --- | --- | --- | --- | --- | --- | --- | --- | --- |
| | | | | | 90° C. | 95° C. | 100° C. | 110° C. | 120° C. | 130° C. | 140° C. |
| EX. 1 | 100 | 0 | 111 | 130 | — | 0.22 | 0.36 | 1.76 | 9.2 | 9.96 | 9.77 |
| EX. 2 | 90 | 10 | 107 | 125 | — | 0.21 | 0.40 | 6.88 | 9.3 | 9.8 | 9.83 |
| EX. 3 | 80 | 20 | 100 | 120 | — | 0.16 | 1.18 | 7.26 | 9.64 | 9.14 | 9.05 |
| EX. 4 | 60 | 40 | 90 | 120 | 0.61 | 4.19 | 6.16 | 7.6 | 8.82 | 8.88 | 8.84 |
| EX. 5 | 40 | 60 | 85 | 110 | 1.23 | 3.89 | 5.38 | 8.04 | 8.46 | 8.66 | 7.87 |
| EX. 6 | 20 | 80 | 85 | 110 | 1.8 | 4.41 | 6.11 | 7.64 | 7.86 | 7.24 | 7.13 |
| EX. 7 | 10 | 90 | 85 | 110 | 1.89 | 4.232 | 5.4 | 7.07 | 7.14 | 6.9 | 7.0 |
| EX. 8 | 0 | 100 | 85 | 110 | 2.25 | 4.22 | 5.86 | 6.95 | 7.1 | 6.8 | 6.22 |
| | U1 0.925 (g/cc) | U2 0.905 (g/cc) | | | | | | | | | |
| CEX. 1 | 80 | 20 | 105 | 130 | — | 0.22 | 0.32 | 5.6 | 8.3 | 8.99 | 8.49 |
| CEX. 2 | 60 | 40 | 101 | 130 | 0.23 | 0.22 | 0.79 | 7.08 | 8.17 | 8.67 | 8.6 |
| EX. 9 | 0 | 100 | 97 | 130 | — | 0.30 | 1.28 | 5.2 | 6.0 | 6.3 | 6.21 |

SIT - Seal Initiation Temperature
POT - Plateau Onset Temperature Representing the Tearing Failure Mode

TABLE III

| Example (EX) or Comparative Examples (CEX) | | | | | | | | | | | |
|---|---|---|---|---|---|---|---|---|---|---|---|
| | U3 0.918 | X2 0.905 | SIT | POT | \multicolumn{7}{c}{Strength of Seal Part (N/cm)} | | | | | |
| | (g/cc) | (g/cc) | (°C.) | (°C.) | 90° C. | 95° C. | 100° C. | 110° C. | 120° C. | 130° C. | 140° C. |
| EX. 10 | 100 | 0 | 98 | 125 | 0.13 | 0.22 | 0.68 | 7.24 | 8.38 | 8.13 | 8.9 |
| EX. 11 | 80 | 20 | 95 | 125 | 0.06 | 0.37 | 3.7 | 5.85 | 6.73 | 6.94 | 6.76 |
| EX. 12 | 60 | 40 | 87 | 120 | 1.9 | 4.57 | 5.41 | 6.43 | 7.19 | 7.57 | 7.14 |
| EX. 13 | 0 | 100 | 77 | 102 | 3.6 | 4.92 | 6.08 | 6.69 | 6.46 | 6.3 | 6.33 |
| | U4 0.917 (g/cc) | X2 0.905 (g/cc) | | | | | | | | | |
| EX. 14 | 100 | 0 | 102 | 130 | 0.12 | 0.15 | 0.37 | 6.96 | 8.36 | 8.86 | 8.9 |
| EX. 15 | 80 | 20 | 102 | 130 | 0.20 | 0.26 | 0.41 | 6.74 | 7.78 | 8.31 | 8.13 |
| EX. 16 | 60 | 40 | 90 | 90 | 0.38 | 3.02 | 5.45 | 6.29 | 7.64 | 7.91 | 7.21 |
| | U5 0.925 (g/cc) | X2 0.905 (g/cc) | | | | | | | | | |
| EX. 17 | 100 | 0 | 117 | 130 | — | 0.04 | 0.05 | 0.16 | 7.87 | 8.42 | 8.669 |
| EX. 18 | 80 | 20 | 105 | 125 | — | 0.11 | 0.21 | 4.09 | 7.89 | 8.72 | 8.28 |
| EX. 19 | 60 | 40 | 95 | 95 | 0.14 | 0.38 | 4.92 | 6.37 | 7.47 | 8.04 | 7.41 |
| | U6 0.935 (g/cc) | X2 0.905 (g/cc) | SIT (°C.) | POT (°C.) | 90° C. | 95° C. | 100° C. | 110° C. | 120° C. | 130° C. | 140° C. |
| EX. 20 | 100 | 0 | 115 | 130 | — | — | — | 0.19 | 3.59 | 11.23 | 10.95 |
| EX. 21 | 80 | 20 | 114 | 130 | — | — | — | 0.29 | 8.59 | 9.31 | 9.52 |
| EX. 22 | 60 | 40 | 110 | 130 | — | — | — | 0.69 | 7.37 | 8.62 | 8.59 |

| | U7 0.952 (g/cc) | X1 0.905 (g/cc) | SIT (°C.) | POT (°C.) | 90° C. | 95° C. | 100° C. | 110° C. | 120° C. | 130° C. | 140° C. | 150° C. |
|---|---|---|---|---|---|---|---|---|---|---|---|---|
| EX. 23 | 100 | 0 | 126 | 137 | — | — | — | — | 0.05 | 2.6 | 20.2 | 29.16 |
| EX. 24 | 80 | 20 | 125 | 135 | — | — | — | — | 0.24 | 2.59 | 19.43 | 24.07 |
| EX. 25 | 60 | 40 | 121 | 135 | — | — | — | 0.07 | 0.41 | 4.41 | 16.35 | 19.2 |
| EX. 26 | 40 | 60 | 102 | 135 | 0.14 | 0.22 | 0.44 | 1.7 | 9.63 | 12.3 | 13.03 | 13.02 |
| EX. 27 | 20 | 80 | 85 | 125 | 3.01 | 4.98 | 6.84 | 9.08 | 10.54 | 11.0 | 10.76 | 10.72 |
| EX. 28 | 0 | 100 | 85 | 110 | 2.25 | 4.22 | 5.86 | 6.95 | 7.1 | 6.8 | 6.22 | 6.4 |

SIT - Seal Initiation Temperature
POT - Plateau Onset Temperature Representing the Tearing Failure Mode

TABLE IV

| Example (EX) or Comparative Examples (CEX) | | | | | | | | | | | | |
|---|---|---|---|---|---|---|---|---|---|---|---|---|
| | U8 0.925 (g/cc) | X3 0.887 (g/cc) | SIT (°C.) | POT (°C.) | \multicolumn{8}{c}{Strength of Sea Part (N/cm)} | | | | | | | |
| | | | | | 80° C. | 90° C. | 95° C. | 100° C. | 110° C. | 120° C. | 130° C. | 140° C. |
| EX. 28 | 100 | 0 | 102 | 130 | — | 0.16 | 0.24 | 0.43 | 5.62 | 8.46 | 9.4 | 8.93 |
| EX. 29 | 80 | 20 | 87 | 120 | 0.22 | 0.64 | 1.14 | 3.52 | 8.72 | 10.27 | 10.71 | 10.56 |
| EX. 30 | 60 | 40 | 855 | 125 | 0.23 | 3.15 | 5.7 | 6.85 | 8.17 | 9.55 | 10.32 | 9.6 |
| | U3 0.918 (g/cc) | X3 0.887 (g/cc) | | | | | | | | | | |
| EX. 10 | 100 | 0 | 98 | 125 | — | 0.13 | 0.22 | 0.68 | 7.24 | 8.38 | 8.86 | 7.93 |
| EX. 31 | 80 | 20 | 90 | 120 | — | 0.41 | 3.16 | 5.61 | 7.01 | 7.79 | 7.99 | 8.35 |
| EX. 32 | 60 | 40 | 73 | 110 | 2.83 | 5.0 | 5.67 | 6.55 | 9.05 | 9.26 | 8.54 | 8.03 |
| | U4 0.917 (g/cc) | X3 0.887 (g/cc) | | | | | | | | | | |
| EX. 14 | 100 | 0 | 102 | 130 | — | 0.12 | 0.15 | 0.37 | 6.96 | 8.36 | 8.86 | 8.9 |

TABLE IV-continued

| Example (EX) or Comparative Examples (CEX) | | | | | | | | | | | | |
|---|---|---|---|---|---|---|---|---|---|---|---|---|
| EX. 33 | 80 | 20 | 85 | 120 | 0.28 | 1.86 | 3.76 | 6.61 | 8.71 | 10.96 | 10.96 | 9.43 |
| EX. 34 | 60 | 40 | 75 | 125 | 1.45 | 5.09 | 5.61 | 6.31 | 8.06 | 9.48 | 9.38 | 8.89 |
|  | U9 0.925 (g/cc) | X3 0.887 (g/cc) | | | | | | | | | | |
| EX. 35 | 100 | 0 | 108 | 110 | — | 0.09 | 0.14 | 0.26 | 5.9 | 7.49 | 9.58 | 9.46 |
| EX. 36 | 80 | 20 | 95 | 115 | — | 0.24 | 0.43 | 3.37 | 9.25 | 9.62 | 9.14 | 9.49 |
| EX. 37 | 60 | 40 | 83 | 117 | 0.13 | 2.9 | 4.44 | 6.57 | 8.03 | 8.07 | 8.12 | 8.15 |
| EX. 38 | 0 | 100 | 55 | 80 | 4.34 | 4.59 | 4.32 | 4.09 | 4.35 | 4.32 | 4.17 | — |

SIT - Seal Initiation Temperature
POT - Plateau Onset Temperature Representing the Tearing Failure Mode
*All the Blends uo to EX. 38 were made by melt blending (melt homogenization), followed by cast film extrusion

TABLE V

| Example (EX) or Comparative Examples (CES) | | | | | | | | | | | | | |
|---|---|---|---|---|---|---|---|---|---|---|---|---|---|
| | U4 0.917 | X4 0.885 | (°C.) | (°C.) | Strength of Seal Part (N/cm) | | | | | | | | |
| | (g.cc) | (g/cc) | (°C.) | (°C.) | 70° C. | 80° C. | 90° C. | 95° C. | 100° C. | 110° C. | 120° C. | 130° C. | 140° C. |
| EX. 14 | 100 | 0 | 102 | 130 | — | — | 0.12 | 0.15 | 0.37 | 6.96 | 8.36 | 8.86 | 8.9 |
| EX. 39 | 80 | 20 | 97 | 130 | — | — | — | 0.33 | 0.69 | 5.28 | 6.36 | 7.19 | 7.37 |
| EX. 40 | 70 | 30 | 70 | 127 | 0.49 | 4.39 | 5.4 | 5.49 | 6.08 | 6.15 | 6.11 | 6.84 | 6.55 |
| EX. 41 | 60 | 40 | 62 | 125 | 1.88 | 5.2 | 5.32 | 5.53 | 5.47 | 5.42 | 5.58 | 6.53 | 5.71 |
| | U4 0.917 (g/cc) | X5 0.878 (g/cc) | | | | | | | | | | | |
| EX. 42 | 80 | 20 | 65 | 130 | 1.97 | 4.59 | 5.24 | 5.34 | 6.66 | 6.6 | 6.38 | 6.96 | 6.67 |
| EX. 43 | 70 | 30 | 60 | 130 | 3.72 | 5.34 | 5.23 | 5.4 | 5.33 | 5.23 | 5.53 | 5.67 | 5.85 |
| EX. 44 | 60 | 40 | 55 | 127 | 3.16 | 4.47 | 4.52 | 4.48 | 4.48 | 4.6 | 4.75 | 5.02 | 4.97 |

SIT - Seal Initiation Temperature
POT - Plateau Onset Temperature Representing the Tearing Failure Mode
The Seal Strength Data Reported is for an Average Film Thickness of 2.0–2.3 mils. For Films Having Higher Thickness, the Seal Strength Data is Normalized for 2.0 mils.
*Samples EX. 39 to EX. 44 were made by dry blending the two components, followed by blown film extrusion.

We claim:

1. A polymer blend comprising from about 40 to about 99 weight percent of at least one first ethylene interpolymer produced using a metallocene catalyst system, said first ethylene interpolymer having a molecular weight distribution of 3 or less and a composition distribution breadth index greater than 50 percent and from about 1 to about 60 weight percent of at least one second ethylene interpolymer produced using a Ziegler-Natta catalyst system, said second ethylene interpolymer having a molecular weight distribution greater than 3 and a composition distribution breadth index less than 50 percent.

2. The interpolymer blend of claim 1 wherein the first polymer has a composition distribution breadth index greater than 60%.

3. The interpolymer blend of claim 1 wherein the first polymer has a composition distribution breadth index greater than 70%.

4. The polymer blend of claim 1 wherein said polymer blend comprises from about 60 to 99 weight percent of said first interpolymer.

5. The polymer blend of claim 1 wherein said polymer blend comprises 60 to 90 weight percent of said first interpolymer.

6. The interpolymer blend of claim 1 wherein said polymer blend comprises 60 to 90 weight percent of said first interpolymer of said first component.

7. The interpolymer blend of claim 1 wherein said first polymer has a molecular weight distribution less than about 2.5.

8. The interpolymer blend of claim 1 wherein said first polymer has a density in the range of about 0.875 g/cm$^3$ to about 0.96 g/cm$^3$.

9. The polymer blend of claim 1 wherein said first interpolymer is a copolymer of ethylene.

10. The interpolymer blend of claim 1 wherein said second polymer is a LLDPE.

11. The polymer blend of claim 1 wherein said blend has a density in the range of 0.88 to 0.94 g/cm$^3$ and a melt index of 0.5 to 20 dg/min.

12. A film comprising at least one layer of from about 40 to about 99 weight percent of an ethylene copolymer or terpolymer produced using a metallocene catalyst system, said ethylene copolymer or terpolymer having a molecular weight distribution less than about 3 and a composition distribution breadth index greater than 50 percent and from about 1 to 60 weight percent of an ethylene interpolymer produced using a Ziegler-Natta catalyst system, said ethylene interpolymer having a molecular weight distribution greater than 3 and a composition distribution breadth index less than 50 percent.

13. The film of claim 12 wherein the ethylene copolymer or terpolymer has a composition distribution breadth index greater than 60%.

14. The film of claim 12 wherein said polymer blend comprises from about 60 to 98 weight percent of said ethylene copolymer or terpolymer.

15. The film of claim 12 wherein said ethylene interpolymer is a LLDPE.

16. The film of claim 12 wherein said film has at least one additional resin layer selected from at least one of the group consisting of LLDPE, LDPE, HDPE, PP or the like or a blend thereof.

17. The film of claim 12 wherein said film when used as a seal layer has a seal initiation temperature less than 100° C.

18. The film of claim 12 wherein said film when used as a seal layer has a plateau-on-set temperature less than 120° C.

19. The film of claim 12 wherein said film is a single layer.

20. The film of claim 12 wherein said film at a sealing temperature of about 95° C. has a seal strength at room temperature greater than about 3N/cm.

21. The film of claim 12 wherein said film at a sealing temperature of about 100° C. has a seal strength at room temperature greater than about 5N/cm.

22. A heat sealable film comprising a polymer blend of from about 60 to about 99 weight percent of the total weight of the polymer blend of at least one first ethylene interpolymer produced using a metallocene catalyst system, said first ethylene interpolymer having a molecular weight distribution less than about 3 and a composition distribution breadth index greater than 50 percent and from about 1 to about 40 weight percent of the total weight of the polymer blend of at least one second interpolymer produced using a Ziegler-Natta catalyst system, said second ethylene interpolymer having a molecular weight distribution greater than 3 and a composition distribution breadth index less than 50 percent.

23. The film of claim 22 wherein said film when used as a seal layer has a seal initiation temperature less than 100° C.

24. The film of claim 22 wherein said film has at least one additional resin layer selected from at least one of the group consisting of LLDPE, LDPE, HDPE, PP or the like or a blend thereof.

25. A method of forming an article of manufacture comprising the step of:
pressing at least two portions or the same portion of said article together to form a seal at a temperature sufficient to soften at least one portion of said article wherein said softened portion comprises a polymer blend of from about 40 to about 99 weight percent of a first ethylene interpolymer produced using a metallocene catalyst system, said first ethylene interpolymer having a molecular weight distribution less than about 3 and a composition distribution breadth index greater than 50 percent and from about 1 to about 40 weight percent of a second ethylene interpolymer produced using a Ziegler-Natta catalyst system, said second ethylene interpolymer having a molecular weight distribution greater than 3 and a composition distribution breadth index less than 50 percent.

26. The method of claim 25 wherein said temperature is below about 110° C.

27. The method of claim 25 wherein said temperature is less than 100° C.

28. The method of claim 25 wherein said first component comprises from about 60 to 90 weight percent of the first ethylene interpolymer.

29. The method of claim 25 wherein the first polymer has a composition distribution breadth index greater than 60%.

30. The method of claim 25 wherein said polymer blend at a sealing temperature of 95° C. has a seal strength of about 3N/cm.

31. An article of manufacture comprising a seal layer, said seal layer comprising from about 60 to about 99 weight percent of a first ethylene interpolymer produced using a metallocene catalyst system, said first ethylene interpolymer having a molecular weight distribution less than about 3 and a composition distribution breadth index greater than 50 percent and from about 1 to about 40 weight percent of a second ethylene interpolymer produced using a Ziegler-Natta catalyst system, said second ethylene interpolymer having a molecular weight distribution greater than 3 and a composition distribution breadth index less than 50 percent.

32. The article of claim 31 wherein said film when used as a seal layer has a seal initiation temperature less than 100° C.

33. The article of claim 31 wherein the first ethylene interpolymer has a composition distribution breadth index greater than 70%.

34. The article of manufacture of claim 31 wherein said article further comprises additional layers.

35. The article of manufacture of claim 31 is a container wherein said seal layer comprises from about 60 to about 90 weight percent of the first ethylene interpolymer and from about 10 to about 40 weight percent of the second ethylene interpolymer.

36. A container comprising a body and a sealing member wherein said member comprises a seal layer, said seal layer comprising a polymer blend of from about 40 to about 99 weight percent of a first ethylene interpolymer produced using a metallocene catalyst system, said first ethylene interpolymer having a molecular weight distribution less than about 3 and a composition distribution breadth index greater than 50 percent and from about 1 to about 60 weight percent of a second ethylene interpolymer produced using a Ziegler-Natta catalyst system, said second ethylene interpolymer having a molecular weight distribution greater than 3 and a composition distribution breadth index less than 50 percent.

37. The container of claim 36 wherein said sealing member is sealed to said body.

38. The container of claim 36 wherein said seal layer comprises from about 50 to about 99 weight percent of said first ethylene interpolymer.

39. The container of claim 36 wherein said seal layer comprises from about 60 to about 98 weight percent of said first component.

40. The container of claim 36 wherein said seal layer at a sealing temperature of about 95° C. has a seal strength of greater than 3N/cm.

41. The container of claim 36 wherein said seal layer has a composition distribution breadth index greater than about 60%.

42. The container of claim 36 wherein said seal layer comprises LLDPE as said second ethylene interpolymer.

* * * * *